(12) United States Patent
Furusawa (10) Patent No.: US 8,866,759 B2
(45) Date of Patent: Oct. 21, 2014

(54) DISPLAY DEVICE WITH TOUCH PANEL AND SPACER

(75) Inventor: Takeharu Furusawa, Mobara (JP)

(73) Assignees: Japan Display Inc., Tokyo (JP); Panasonic Liquid Crystal Display Co., Ltd., Hyogo-ken (JP)

(*) Notice: Subject to any disclaimer, the term of this patent is extended or adjusted under 35 U.S.C. 154(b) by 38 days.

(21) Appl. No.: 13/049,092

(22) Filed: Mar. 16, 2011

(65) Prior Publication Data

US 2011/0227848 A1 Sep. 22, 2011

(30) Foreign Application Priority Data

Mar. 16, 2010 (JP) ................. 2010-058964

(51) Int. Cl.
| | | |
|---|---|---|
| G06F 3/041 | (2006.01) | |
| G06F 3/044 | (2006.01) | |
| G02F 1/1333 | (2006.01) | |
| G02F 1/1335 | (2006.01) | |

(52) U.S. Cl.
CPC ............. *G06F 3/041* (2013.01); *G06F 3/044* (2013.01); *G06G 1/1626* (2013.01); *G02F 1/133308* (2013.01); *G02F 1/133615* (2013.01); *G02F 1/13338* (2013.01); *G02F 2001/133317* (2013.01); *G02F 2001/133388* (2013.01); *G02F 2001/133331* (2013.01)
USPC ........................................................ 345/173

(58) Field of Classification Search
USPC ................... 345/173–178; 349/110
See application file for complete search history.

(56) References Cited

U.S. PATENT DOCUMENTS

| | | | |
|---|---|---|---|
| 6,388,722 B1* | 5/2002 | Yoshii et al. | 349/62 |
| 7,903,182 B2 | 3/2011 | Ishii et al. | |
| 7,952,862 B2 | 5/2011 | Sakai | |
| 2004/0141110 A1* | 7/2004 | Yu et al. | 349/110 |
| 2008/0007538 A1* | 1/2008 | Kotera et al. | 345/173 |
| 2008/0079864 A1* | 4/2008 | Nishimura | 349/58 |
| 2009/0079706 A1* | 3/2009 | Mishima et al. | 345/173 |
| 2009/0115738 A1* | 5/2009 | Chueh | 345/173 |
| 2010/0033443 A1* | 2/2010 | Hashimoto | 345/173 |
| 2010/0188821 A1* | 7/2010 | Yamazaki et al. | 361/720 |

FOREIGN PATENT DOCUMENTS

| | | |
|---|---|---|
| JP | 2003-043450 | 2/2003 |
| JP | 2004-280432 | 10/2004 |
| JP | 2008-164687 | 7/2008 |
| JP | 2009-069321 | 4/2009 |
| JP | 2009-198851 | 9/2009 |

* cited by examiner

*Primary Examiner* — Chanh Nguyen
*Assistant Examiner* — Sanghyuk Park
(74) *Attorney, Agent, or Firm* — Antonelli, Terry, Stout & Kraus, LLP.

(57) ABSTRACT

The display device with a touch panel according to the present invention has high reliability and is a display device with a touch panel having a display panel and a touch panel placed on the front surface of the display panel, wherein the display panel has a first substrate and a second substrate provided so as to be layered on the first substrate, the first substrate has a non-overlapping region that does not overlap the second substrate, and the touch panel is a liquid crystal display device with a touch panel secured on the second substrate, the touch panel has an overlapping region that overlaps the non-overlapping region of the first substrate, and a spacer is secured to the touch panel between the non-overlapping region of the first substrate and the overlapping region of the touch panel.

11 Claims, 9 Drawing Sheets

DISPLAY DEVICE WITH TOUCH PANEL AND SPACER

CROSS-REFERENCE TO RELATED APPLICATION

The present application claims priority over Japanese Application JP2010-058964 filed on Mar. 16, 2010, the contents of which are hereby incorporated into this application by reference.

BACKGROUND OF THE INVENTION (1) Field of the Invention

The present invention relates to a display device with a touch panel, and in particular to a technology that is effective when applied to a display device with a touch panel that is used as the display portion of a portable device, such as a portable phone.

(2) Description of the Related Art

An example of the display devices is a liquid crystal display module (liquid crystal display device). As for a liquid crystal display module, a TFT (thin film transistor) liquid crystal display device having a compact liquid crystal color display panel of which the number of sub-pixels is approximately 240×320×3 is known and widely used as the display portion of a portable device, such as a portable phone.

In addition, a liquid crystal display module with a touch panel where a touch panel is provided on the front surface of the liquid crystal display panel is known. Such a liquid crystal display module with a touch panel is disclosed in JP2003-43450A, for example. JP2003-43450A also discloses a technology for miniaturizing a liquid crystal panel by providing a support member for supporting the first protrusion of the touch panel that protrudes from the liquid crystal panel when the touch panel and the liquid crystal panel are layered on top of each other.

SUMMARY OF THE INVENTION

Figure 9:
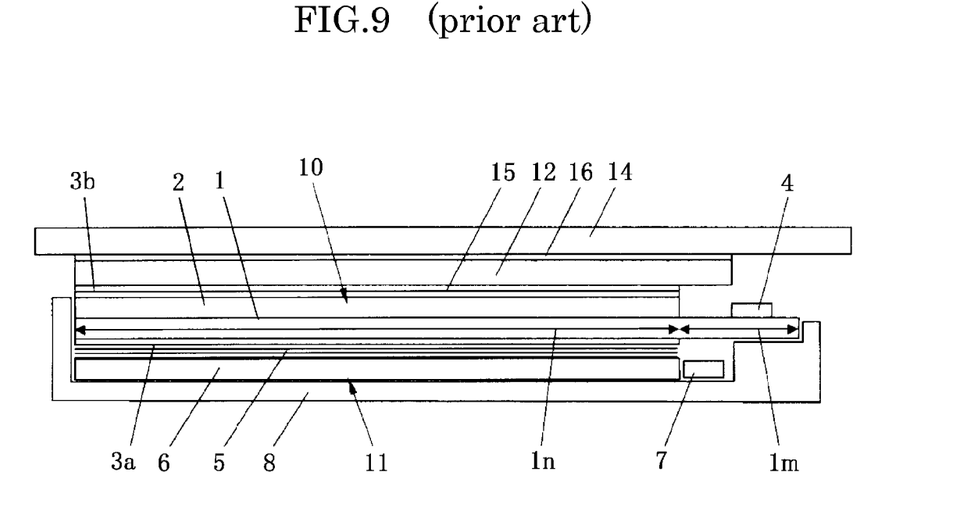
FIG. 9 is a cross sectional diagram showing the structure of a conventional liquid crystal display module with a touch panel.
Figure 10:
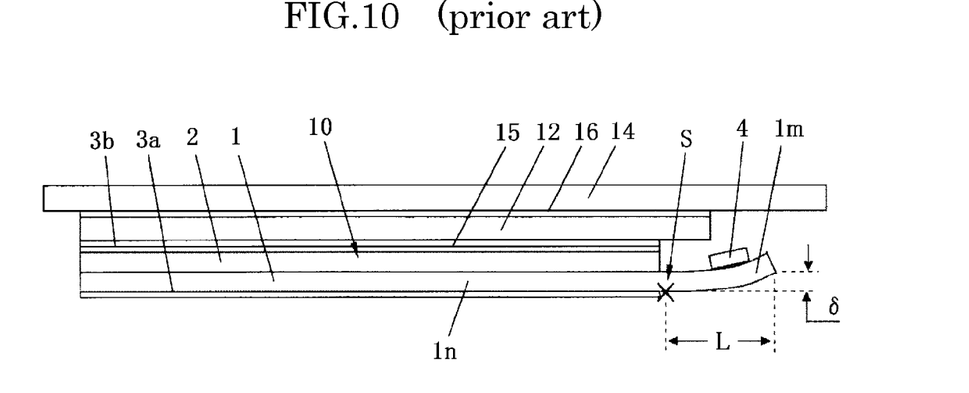
FIG. 10 is a cross sectional diagram for illustrating a problem with the liquid crystal display module with a touch panel in FIG. 9.

FIG. 9 is a cross sectional diagram schematically showing the structure of a conventional liquid crystal display module with a touch panel, and FIG. 10 is a cross sectional diagram illustrating a problem with the liquid crystal display module with a touch panel in FIG. 9. Here, the backlight and some other parts shown in FIG. 9 are not shown in FIG. 10.

As shown in FIG. 9, the conventional liquid crystal display module with a touch panel is provided mainly with a liquid crystal display panel 10, a touch panel 12 placed on the front surface of the liquid crystal display panel 10, a front panel (front window) 14 placed on the front surface of the touch panel 12, and a backlight 11 placed on the rear surface of the liquid crystal display panel 10, and furthermore is provided with a flexible printed circuit board connected to the liquid crystal display panel 10, not shown.

The backlight 11 is formed of a group of optical sheets 5, a light guiding plate 6 placed on the rear side of the group of optical sheets 5, a reflective sheet (not shown) placed on the rear surface of the light guiding plate 6, light emitting diodes 7 placed on the side of the light guiding plate 6, and a mold frame for containing and supporting the group of optical sheets 5, the light guiding plate 6, the reflective sheet and the light emitting diodes 7.

The liquid crystal display panel 10 is formed of a first substrate 1 on which pixel electrodes, thin film transistors and the like are formed (hereinafter referred to as TFT substrate), a second substrate 2 on which color filters and the like are formed (hereinafter referred to as CF substrate), and a liquid crystal layer sandwiched between the TFT substrate 1 and the CF substrate 2. The TFT substrate 1 and the CF substrate 2 are rectangular in the plane. The long sides of the TFT substrate 1 are longer than the long sides of the CF substrate 2 so that the TFT substrate 1 has an overlapping region 1n that overlaps the CF substrate 2 and a non-overlapping region 1m that does not overlap the CF substrate 2, with the overlapping region 1n and the non-overlapping region 1m being side by side along the long sides. A semiconductor chip 4 having a driver circuit for driving and controlling the liquid crystal display panel 10 is mounted on the non-overlapping region 1m of the TFT substrate 1, and furthermore one end of the flexible printed circuit board (FPC) is connected to the non-overlapping region 1m. Glass substrates, for example, are used for the TFT substrate 1 and the CF substrate 2.

A polarizing plate 3a is pasted to the TFT substrate 1 on the side opposite to the liquid crystal layer. In addition, a polarizing plate 3b is pasted to the CF substrate 2 on the side opposite to the liquid crystal layer. The surface of the front panel 14 on the liquid crystal layer side is pasted and secured to the polarizing plate 3b on the CF substrate 2 on the side opposite to the liquid crystal layer with an adhesive 15 in between. A front panel 14 is pasted and secured to the touch panel 12 on the side opposite to the liquid crystal layer with an adhesive 16 in between. The group of optical sheets 5 in the backlight 11 is provided on the rear of the polarizing plate 3b.

Incidentally, a drop impact test is performed on liquid crystal display modules with a touch panel. As shown in FIG. 9, the liquid crystal display panel 10 in the conventional liquid crystal display module with a touch panel has a structure where the TFT substrate 1 has the overlapping region 1n that overlaps the CF substrate 2 and the non-overlapping region that does not overlap the CF substrate 2. In the case of this structure, the bending strength is high in the multilayer portion where the TFT substrate 1 and the CF substrate 2 overlap, but the bending strength is low in the non-overlapping region 1m of the TFT substrate 1, and therefore the non-overlapping region 1m of the TFT substrate 1 easily bends towards the front due to impact when the module is dropped. This bending of the TFT substrate 1 becomes a factor that causes cracking or other problems in the bordering portion S (shown by x) between the overlapping region 1n where the TFT substrate 1 overlaps the CF substrate 2 and the non-overlapping region 1m where the TFT substrate 1 does not overlap the CF substrate 2, and therefore it is necessary to prevent bending in order to make the module more reliable.

In recent years, as the demand for reducing the thickness of the liquid crystal display modules with a touch panel has increased in the market, the glass substrates that form the liquid crystal display panel 10 have tended to be thinner. Together with this, the potential of cracks being caused in the bordering portion S (shown by x) in the TFT substrate 1 due to the bending in the non-overlapping region 1m of the TFT substrate 1 has become higher, and thus it is important to further increase the reliability.

Here, an example of the examination by the present inventor on how stress is applied when the TFT substrate is bent is described.

The stress a applied in the bordering portion S between the overlapping region in and the non-overlapping region 1m of the TFT substrate 1 is found using the following formula:

$$\sigma = (3 \times E \times t)/(2 \times L^2) \times \delta \tag{1}$$

E: Young's modulus of glass
t: thickness of glass plate
L: length of non-overlapping region (width)

δ: amount of bending

Here, in the case where E=77,000 MPa, t=0.2 mm, L=4 mm and δ=0.2 mm, σ=288 MPa found from the above formula (1).

Since the stress needed to break glass is usually 100 MPa to 200 MPa, the TFT substrate 1 cracks in the bordering portion S when the above described amount of stress is applied.

Thus, the present inventor focused on the touch panel that is mounted on the display module with a touch panel and made the present invention.

An object of the present invention is to provide a technology that can improve the reliability of the display module (display device) with a touch panel.

The above described and other objects as well as novel features of the present invention will be clarified from the description of the present specification and the accompanying drawings.

The outline of the representative inventions from among the inventions disclosed in the present specification is briefly described as follows.

(1) A display device with a touch panel, having a display panel and a touch panel placed on a front surface of the display panel, characterized in that the display panel has a first substrate and a second substrate that is provided so as to be layered on the first substrate, the first substrate has a non-overlapping region that does not overlap the second substrate, and the touch panel is secured on the second substrate, the touch panel has an overlapping region that overlaps the non-overlapping region of the first substrate, and a spacer is secured to the touch panel between the non-overlapping region of the first substrate and the overlapping region of the touch panel.

(2) The display device with a touch panel according to the above (1), characterized in that the spacer is pasted to the touch panel with an adhesive tape in between.

(3) The display device with a touch panel according to the above (1), characterized in that the spacer is not pasted to the non-overlapping region of the first substrate.

(4) The display device with a touch panel according to the above (3), characterized in that the spacer is away from the non-overlapping region of the first substrate or makes contact with the non-overlapping region of the first substrate.

(5) The display device with a touch panel according to the above (1), characterized in that the spacer has a first portion placed between the non-overlapping region of the first substrate and the overlapping region of the touch panel, and a second portion, which is connected to the first portion, is thicker than the distance between the non-overlapping region of the first substrate and the overlapping region of the touch panel and covers at least part of the side of the touch panel on the overlapping region side.

(6) The display device with a touch panel according to the above (1), characterized in that a semiconductor chip having a driving circuit is mounted on the non-overlapping region of the first substrate, and the spacer is formed along the side of the touch panel on the overlapping region side and has a containing portion for containing the semiconductor chip.

(7) The display with a touch panel according to the above (6), characterized in that the containing portion in the spacer is a recess or a through hole in the direction of the thickness of the touch panel.

(8) The display device with a touch panel according to the above (6), characterized in that the containing portion of the spacer is a recess directed from the second substrate to the side of the first substrate on the non-overlapping region side in a plane of the touch panel.

(9) The display device with a touch panel according to the above (5), characterized in that the second portion of the spacer has such a structure that the corner on the front side and on the outer side is rounded.

(10) The display device with a touch panel according to any of the above (1) to (9), characterized in that a front panel is provided on the front surface of the touch panel.

(11) The display device with a touch panel according to any of the above (1) to (10), characterized in that the display panel is a liquid crystal display panel having a liquid crystal layer sandwiched between the first substrate and the second substrate.

The effects of the representative inventions from among the inventions disclosed in the present specification are briefly described as follows.

According to the present invention, the reliability of the display device with a touch panel can be increased.

DESCRIPTION OF THE EMBODIMENTS

In the following, the embodiments of the present invention are described in detail in reference to the drawings. Here, the same symbols are attached to the components having the same functions throughout all of the figures for illustrating the embodiments of the invention, and the same descriptions are not repeated.

The present invention is applied to a liquid crystal display module (liquid crystal display device) with a touch panel, which is one type of display module (display device) with a touch panel according to the below described embodiment.

The liquid crystal display module according to the present embodiment is a TFT liquid crystal display device having a compact color liquid crystal display panel having approximately 240×320×3 pixels and is used as a display portion of a portable device, such as a portable phone.

Figure 1:
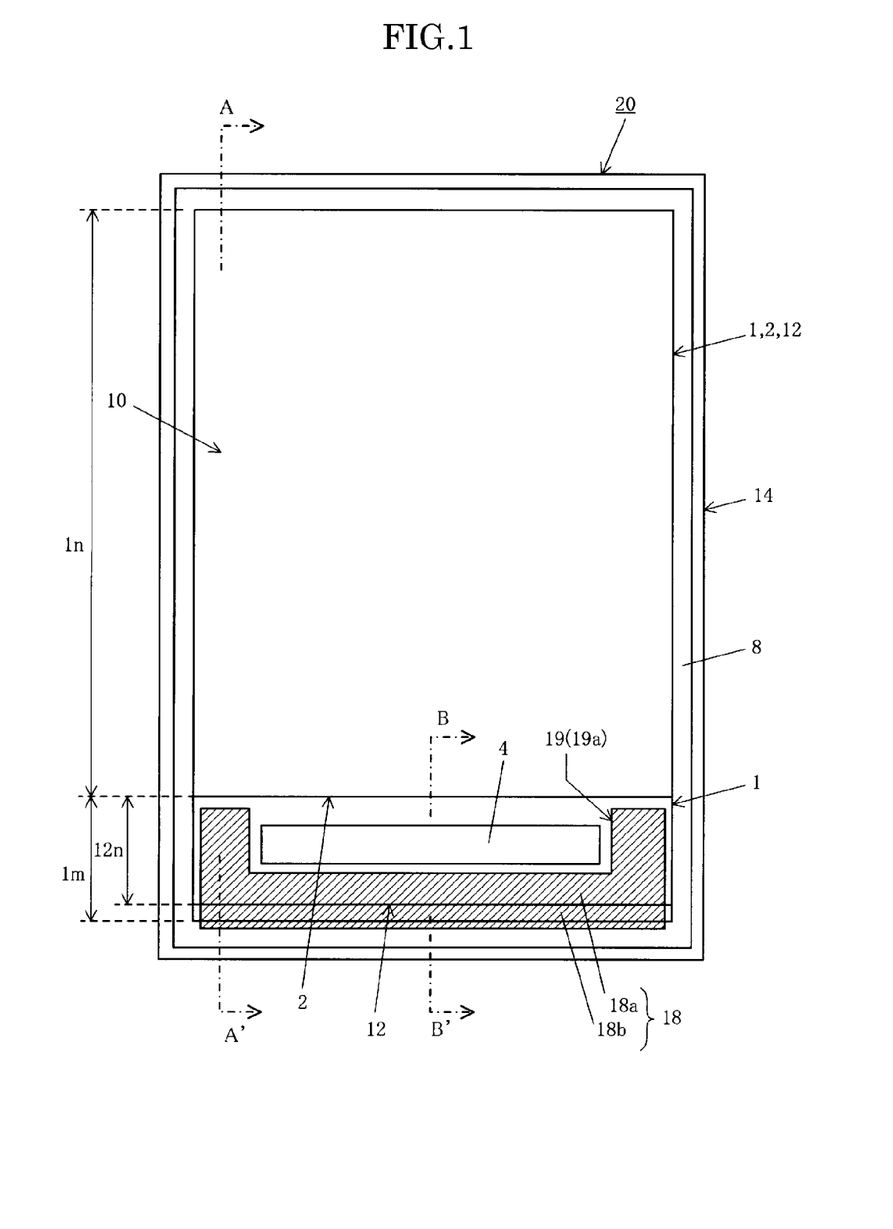
FIG. 1 is a plan diagram schematically showing the configuration of a liquid crystal display module with a touch panel according to one embodiment of the present invention.
Figure 2:
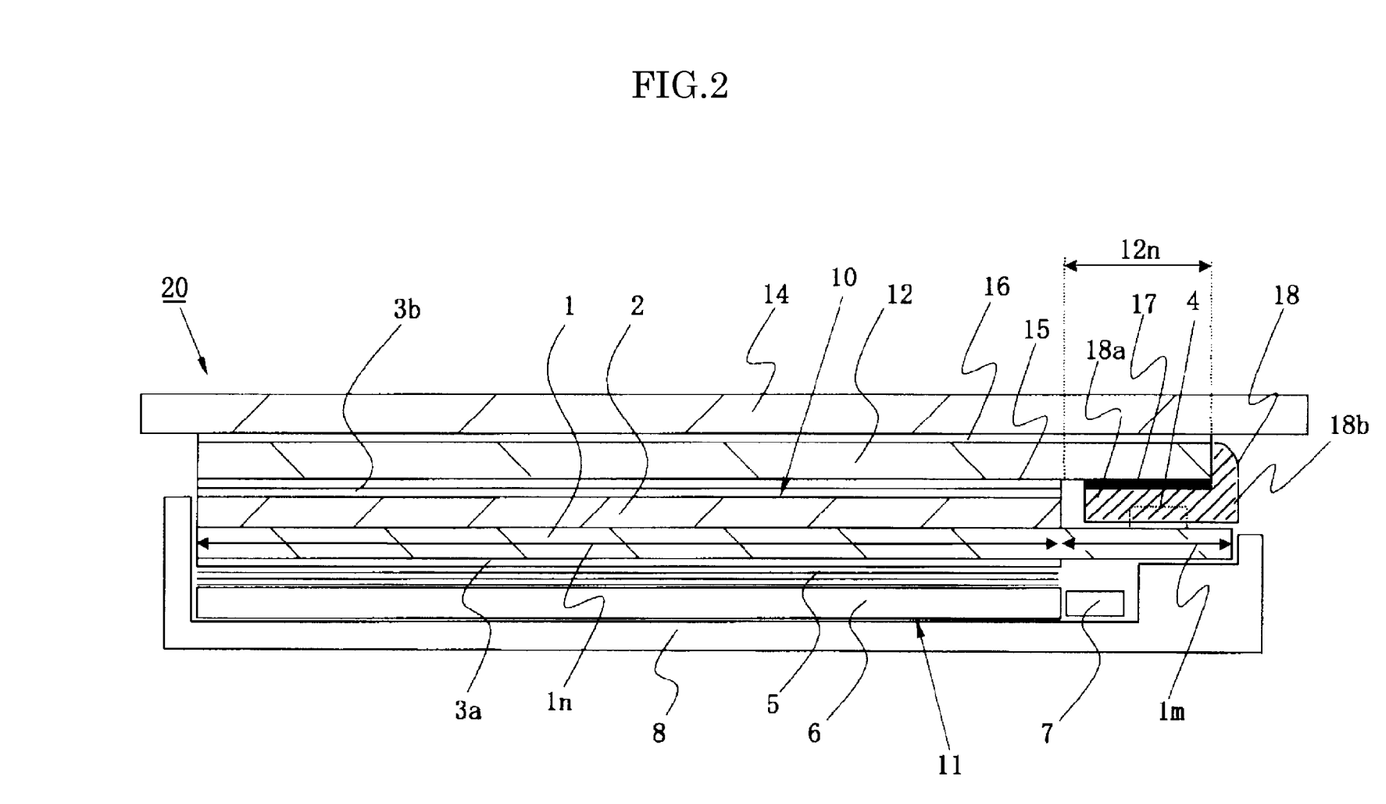
FIG. 2 is a cross sectional diagram showing the structure along line A-A' in FIG. 1.
Figure 3:
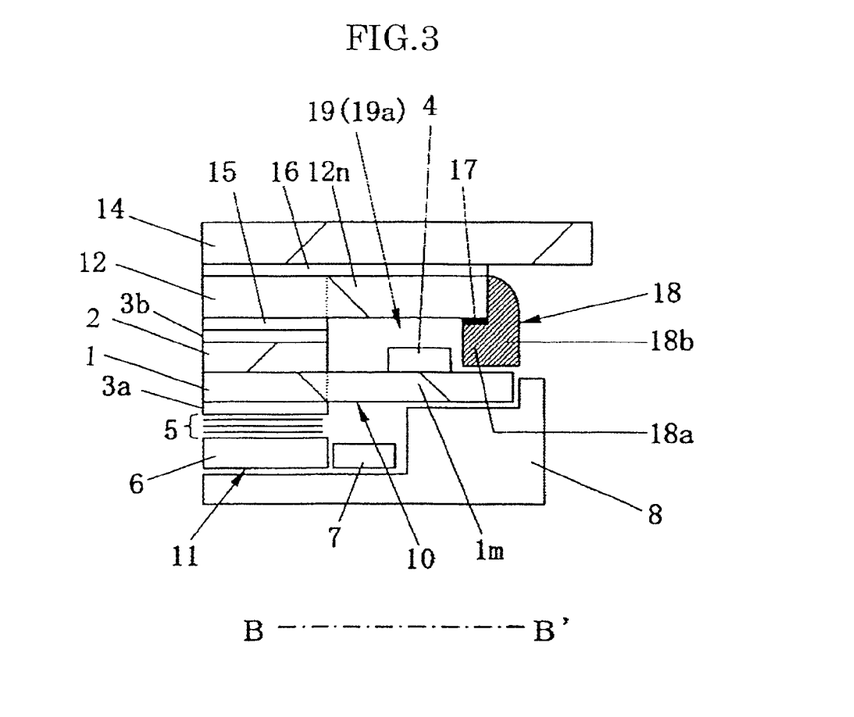
FIG. 3 is a cross sectional diagram showing the structure along line B-B' in FIG. 1.
Figure 4:
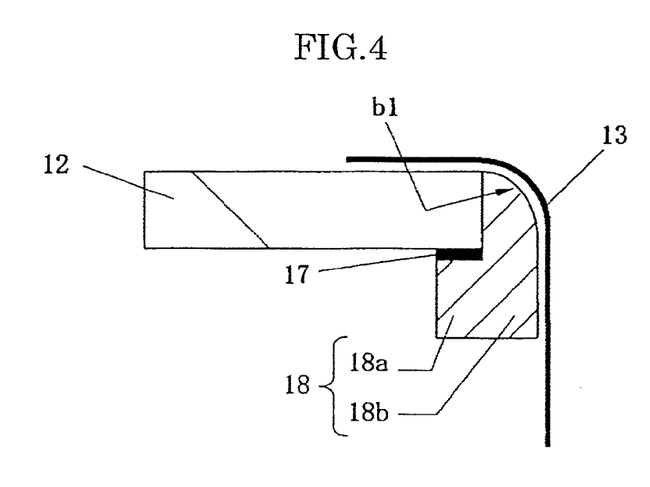
FIG. 4 is a cross sectional diagram showing an enlarged portion in FIG. 3.

FIGS. 1 to 4 show the liquid crystal display module with a touch panel according to one embodiment of the present invention, wherein FIG. 1 is a plan diagram schematically showing the configuration of the liquid crystal display module with a touch panel, FIG. 2 is a cross sectional diagram showing the structure along line A-A' in FIG. 1, FIG. 3 is a cross sectional diagram showing the structure along line B-B' in FIG. 1, and FIG. 4 is a cross sectional diagram showing an enlarged portion in FIG. 3.

The liquid crystal display module 20 with a touch panel according to the present embodiment mainly has a liquid crystal display panel 10, a touch panel 12 placed on the front surface of the liquid crystal display panel 10, a front panel (front window) 14 placed on the front surface of the touch panel 12, and a backlight 11 placed on the rear surface of the liquid crystal display panel 10, and furthermore a flexible printed circuit board connected to the liquid crystal display panel 10 is provided, though not shown.

The liquid crystal display panel 10 is formed of a first substrate 1 on which pixel electrodes, thin film transistors and the like are formed (hereinafter referred to as TFT substrate), a second substrate 2 on which color filters and the like are formed (hereinafter referred to as CF substrate), and a liquid crystal layer sandwiched between the TFT substrate 1 and the CF substrate 2. The TFT substrate 1 and the CF substrate 2 are rectangular in the plane. The long sides of the TFT substrate 1 are longer than the long sides of the CF substrate 2 so that the TFT substrate 1 has an overlapping region 1n that overlaps the CF substrate 2 and a non-overlapping region 1m that does not overlap the CF substrate 2, with the overlapping region 1n and the non-overlapping region 1m being side by side along the long sides. A semiconductor chip 4 having a driver circuit for driving and controlling the liquid crystal display panel 10 is mounted on the non-overlapping region 1m of the TFT substrate 1, and furthermore one end of the flexible printed circuit board (FPC) is connected to the non-overlapping region 1m. Glass substrates, for example, are used for the TFT substrate 1 and the CF substrate 2.

A polarizing plate 3a is pasted to the TFT substrate 1 on the side opposite to the liquid crystal layer (on the backlight side). In addition, a polarizing plate 3b is pasted to the CF substrate 2 on the side opposite to the liquid crystal layer (on the front side).

Here, the liquid crystal display panel 10 in the present embodiment is an IPS (in plane switching) liquid crystal display panel. In the case of IPS types, counter electrodes are provided on the TFT substrate 1 together with pixel electrodes, while in the case of TN or VA liquid crystal display panels, the counter electrodes are provided on the CF substrate 2 while pixel electrodes are provided on the TFT substrate 1.

The backlight 11 has a group of optical sheets 5 provided on the rear surface of the polarizing plate 3b, a light guiding plate 6 placed on the rear side of the optical sheets 5, a reflective sheet (not shown) placed on the rear surface of the light guiding plate 6, light emitting diodes 7 placed on the side of the light guiding plate 6, and a mold frame 8.

The form of the mold frame 8 in the plane is similar to the form of the liquid crystal display panel 10 in the plane, and the size of the mold frame 8 is greater than the liquid crystal display panel 10 in the plane so that the outlines (sides) of the mold frame 8 are placed outside the outlines (sides) of the liquid crystal display panel 10. A mold frame made of a white resin is used as the mold frame 8.

The touch panel 12 is a capacitive coupling touch panel which has a number of first electrodes that mainly extend in the first direction on the front surface of the substrate at a predetermined pitch and a number of second electrodes that extend in the second direction, which is the direction crossing the first direction, at a predetermined pitch. The touch panel 12 detects the difference in the capacitance between the capacitors formed between the first electrodes and the second electrodes, and thus detects the coordinates of the point on the touch panel 12 when a user touches the touch panel 12 with a finger. A transparent insulating substrate, such as of glass, is used as the substrate for the touch panel 12.

The rear surface of the touch panel 12 is pasted and secured to the polarizing plate 3b on the CF substrate 2 with an adhesive 15 in between. A transparent adhesive having the same index of refraction as the polarizing plate 3b is used as the adhesive 15.

The rear surface of the front panel 14 is pasted and secured to the front surface of the touch panel 12 with an adhesive 16 in between. The form of the front panel 14 in the plane is similar to the form of the mold frame 8 in the plane, and the size of the front panel 14 is greater than the mold frame 8 in the plane so that the outlines (sides) of the front panel 14 are placed outside the outlines (sides) of the mold frame 8. The front panel 14 is made of a transparent insulating material, such as of glass or a resin.

Here, though a liquid crystal display module with a touch panel where a front panel 14 is provided on the touch panel 12 is described in the present embodiment, the front panel 14 may not be provided.

In the present embodiment, the form of the touch panel 12 in the plane is similar to the form of the liquid crystal display panel 10 in the plane, and thus is rectangular. The touch panel 12 has a first overlapping region that overlaps the CF substrate 2 of the liquid crystal display panel 10 and a second overlapping region 12n that overlaps the non-overlapping region 1m of the TFT substrate 1 in the liquid crystal display panel 10, which are side by side along the long sides.

A spacer 18 is provided between the non-overlapping region 1m of the TFT substrate 1 in the liquid crystal display panel 10 and the second overlapping region 12n of the touch panel 12. This spacer 18 suppresses or prevents the non-overlapping region 1m of the TFT substrate 1 from bending towards the front due to impact when the display module is dropped in a drop impact test.

The spacer 18 is pasted and secured to the second overlapping region 12n of the touch panel 12 with an adhesive tape 17 in between. Meanwhile, the spacer 18 is not pasted to the non-overlapping region 1m of the TFT substrate 1 in the liquid crystal display panel 10 and is away from the non-overlapping region 1m of the TFT substrate 1 or makes contact with the non-overlapping region 1m of the TFT substrate 1.

The spacer 18 is formed of a first portion 18a placed between the non-overlapping region 1m of the TFT substrate 1, the liquid crystal display panel 10 and the second overlapping region 12n of the touch panel 12, and a second portion 18b, which is connected to the first portion 18a, is thicker than the distance between the non-overlapping region 1m of the TFT substrate 1 and the second overlapping region 12n of the touch panel 12 and covers at least part of the side of the touch panel 12 on the second overlapping region 12n side.

As shown in FIG. 1, the spacer 18 is formed along the short side of the touch panel 12 on the second overlapping region 12n side and has a containing portion 19 for containing the semiconductor chip 4 mounted on the non-overlapping region 1m of the TFT substrate 1. In the present embodiment, the containing portion 19 in the spacer 18 is a recess 19a, the center portion of which is directed from the CF substrate 2 to the short side of the TFT substrate 1 on the non-overlapping region 1m side in the plane of the touch panel 12, and the spacer 18 does not make contact with the semiconductor chip 4. The spacer 18 is formed of a resin that can be easily molded.

Incidentally, as shown in FIG. 9, conventional liquid crystal display modules with a touch panel have a structure where the TFT substrate 1 has an overlapping region 1n that overlaps the CF substrate 2 and a non-overlapping region 1m that does not overlap the CF substrate 2. In the case of this structure, the bending strength is high in the multilayer portion where the TFT substrate 1 and the CF substrate 1 are layered on top of each other in the liquid crystal display panel 10, but the bending strength is low in the non-overlapping region 1m of the TFT substrate 1. Therefore, as shown in FIG. 10, the non-overlapping region 1m of the TFT substrate 1 easily bends towards the front due to impact when the display panel is dropped in a drop impact test. This bending of the TFT substrate 1 becomes a factor that causes cracking or other problems in the bordering portion S (shown by x) between the overlapping region 1n where the TFT substrate 1 overlaps the CF substrate 2 and the non-overlapping region 1m where the TFT substrate 1 does not overlap the CF substrate 2, and therefore it is necessary to prevent bending in order to make the display module more reliable. In particular, as shown in FIG. 10, the display device where a semiconductor chip 4 is provided in the non-overlapping region 1m of the TFT substrate 1 holds the weight of the semiconductor chip 4, and therefore the impact is greater when the display device is dropped.

In contrast, as shown in FIGS. 1 to 3, the liquid crystal display module 20 with a touch panel according to the present embodiment has a second overlapping region 12n where the touch panel 12 overlaps the non-overlapping region 1m of the TFT substrate 1 in the liquid crystal display panel 10, and a spacer 18 is pasted and secured to the second overlapping region 12n of the touch panel 12 between the non-overlapping region 1m of the TFT substrate 1 in the liquid crystal display panel 10 and the second overlapping region 12n of the touch panel 12. In this configuration, the spacer 18 can suppress or prevent the non-overlapping region 1m of the TFT substrate 1 from bending towards the front due to impact when the display module is dropped in a drop impact test, and therefore cracking or other problems can be prevented from being caused by the bending of the TFT substrate 1 in the bordering portion S on the TFT substrate 1 (see FIG. 10), and thus the reliability of the liquid crystal display module 20 with a touch panel can further be increased. Furthermore, the spacer 18 is not secured to the non-overlapping region 1m of the TFT substrate 1 in the liquid crystal display panel 10 in the liquid crystal display module 20 with a touch panel according to the present embodiment, and therefore no load factor is applied to the TFT substrate 1, and thus cracking and other problems can be prevented.

Here, an example of the examination about the stress applied when the TFT substrate 1 in the liquid crystal display module 20 with a touch panel in the present embodiment is bent is shown in reference to FIG. 10. When the Young's modulus of glass is E=77,000 MPa, the thickness of the glass plate is t=0.2 mm and the length of the non-overlapping region 1m is L=4 mm, under the same conditions as the above described prior art, it is possible to make the bend 8 of the TFT substrate 1 be 0.05 mm or less using the spacer 18, and therefore the stress applied to the bordering portion S in the TFT substrate 1 is 72 MPa or less as a result of the above described formula 1, and thus cracking and other problems can be prevented.

In the present embodiment, one part of the spacer 18 is pasted and secured to the second overlapping region 12n on the touch panel 12 and the other part is not pasted or secured to the non-overlapping region 1m on the TFT substrate 1 and is away from the non-overlapping region 1m on the TFT substrate 1 or makes contact with the non-overlapping region 1m on the TFT substrate 1. A number of wires are provided on the non-overlapping region 1m on the TFT substrate 1. Accordingly, the structure in the present embodiment where the spacer 18 is not pasted or secured to the non-overlapping region 1m on the TFT substrate 1 does not cause such a problem that no wires on the TFT substrate 1 are disconnected when the spacer 18 is pasted, and thus the reliability can be further increased.

In addition, the touch panel 12 and the TFT substrate 1 on the liquid crystal display panel 10 are not pasted or secured to each other through the spacer 18 in the structure, and therefore it is easy to repair the liquid crystal display panel 10.

Here, in the case where the spacer 18 is away from the non-overlapping region 1m on the TFT substrate 1, it is naturally necessary to take into consideration that the non-overlapping region 1m on the TFT substrate 1 can be prevented from bending so that the TFT substrate 1 does not crack in the bordering portion S. In addition, it is desirable for the spacer 18 to be made of a material having low elasticity so that the impact can be absorbed when the liquid crystal display module is dropped. In this case as well, it is necessary to take into consideration that the non-overlapping region 1m on the TFT substrate 1 can be prevented from bending so that the TFT substrate 1 does not crack in the bordering portion S.

In the present embodiment, the spacer 18 has a first portion 8a provided between the non-overlapping region 1m on the TFT substrate 1 of the liquid crystal display panel 10 and the second overlapping region 12n on the touch panel 12 and a second portion 18b which is connected to the first portion 8a, has a thickness that is greater than the distance between the non-overlapping region 1m on the TFT substrate 1 and the second overlapping region 12n on the touch panel 12, and covers at least part of the side of the touch panel 12 on the second overlapping region 12n side. In this structure, it is easy to position the spacer 18 when the spacer 18 is pasted to the second overlapping region 12n on the touch panel 12, and therefore the productivity of the liquid crystal display module 20 with a touch panel can be increased.

Here, as shown in FIG. 3, the spacer 18 does not make contact with the semiconductor chip 4 in the present embodiment. However, the spacer 18 may have such a form that there is a recess on the side so that the spacer 18 can cover the semiconductor chip 4.

Here, one end of the flexible printed circuit board (FPC) 13 is connected to the second overlapping region 1n on the touch panel 12, as shown in FIG. 4. One end of the flexible printed circuit board 13 is connected to the second overlapping region 1n of the touch panel 12 on the front, and the flexible printed circuit board 13 is folded towards the liquid crystal display panel 10 so as to cover the short side of the touch panel 12 on the second overlapping region 12n side and the second portion 18b of the spacer 18.

In the present embodiment, the second portion 18b of the spacer 18 has such a structure that the corner portion b1 that is on the front side of the touch panel 12 and connected to the outer wall of the second portion 18b is rounded in the cross section along a line in the direction of the thickness of the touch panel 12. In the present embodiment, the cross section of the corner portion b1 has an arc with a radius of approximately 0.5 mm. In this structure, the flexible printed circuit board 13 can be prevented from bending sharply around the corner portion b1 of the spacer 12, and in addition wires can be prevented from disconnecting due to rubbing of the flexible printed wiring board 13 around this corner portion b1, and therefore the reliability of the liquid crystal display module 20 with a touch panel can be further increased.

In the present embodiment, the spacer 18 has a containing portion 19 for containing the semiconductor chip 4 mounted on the non-overlapping region 1m on the TFT substrate 1. The containing portion 19 is a recess 19a indented in the direction from the CF substrate 2 towards the short side of the TFT substrate 1 on the non-overlapping region 1m side in the plane of the touch panel 12. In this structure, the spacer 18 can be easily provided between the second overlapping region 12n on the touch panel 12 and the non-overlapping region 1m on the TFT substrate 1 of the liquid crystal display panel 10 even when the semiconductor chip 4 is mounted in the non-overlapping region 1m on the TFT substrate 1. In addition, the spacer 18 can be inserted between the second overlapping region 12n on the touch panel 12 and the non-overlapping region 1m on the TFT substrate 1 of the liquid crystal display panel 10 even after the touch panel 12 is pasted to the polarizing plate 3b of the TFT substrate 1 of the liquid crystal display panel 10.

Here, the form of the spacer 18 is not limited to that in the present embodiment. Other forms of the spacer 18 are described below.

Figure 5A:
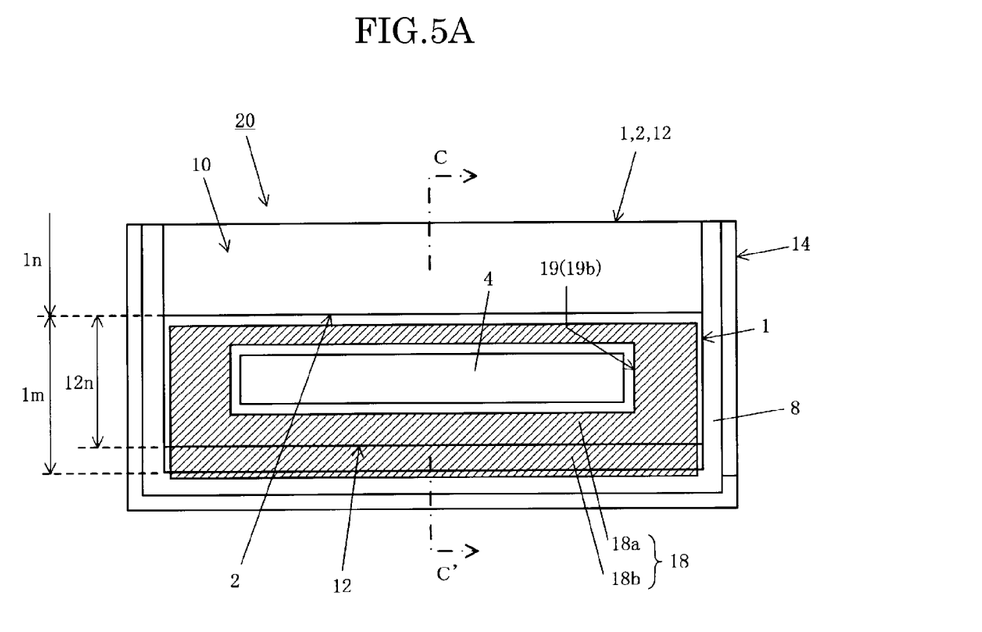
FIGS. 5A and 5B are diagrams showing a first modification of the embodiment according to the present invention (FIG. 5A is a plan diagram showing a portion of the structure of the liquid crystal display module with a touch panel, and FIG. 5B is a cross sectional diagram showing the structure along line C-C' of FIG. 5A)
Figure 5B:
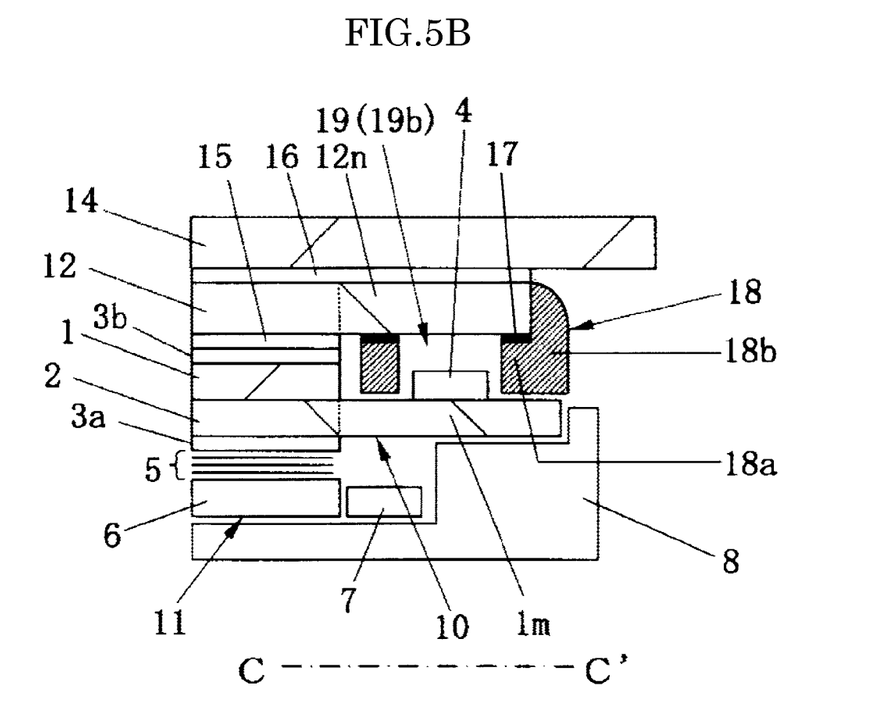

FIGS. 5A and 5B are diagrams showing the first modification of the embodiment of the present invention (FIG. 5A is a plan diagram showing part of the structure of the liquid crystal display module with a touch panel, and FIG. 5B is a cross sectional diagram showing the structure along line C-C' in FIG. 5A).

As shown in FIGS. 5A and 5B, the spacer 18 in the first modification has a containing portion 19 for containing the semiconductor chip 4 mounted in the non-overlapping region 1m on the TFT substrate 1 made of a through hole 19b that penetrates through the touch panel 12. The spacer 18 having this structure has the same effects as the spacer 18 in the above described embodiment shown in FIG. 1. Here, in the case of the present modification, it is difficult to insert the spacer 18 between the second overlapping region 12n on the touch panel 12 and the non-overlapping region 1m on the TFT substrate 1 on the liquid crystal display panel 10 after pasting the touch panel 12 to the polarizing plate 3b on the TFT substrate 1 on the liquid crystal display panel 10, unlike in the case of the spacer 18 as shown in FIG. 1.

Figure 6A:
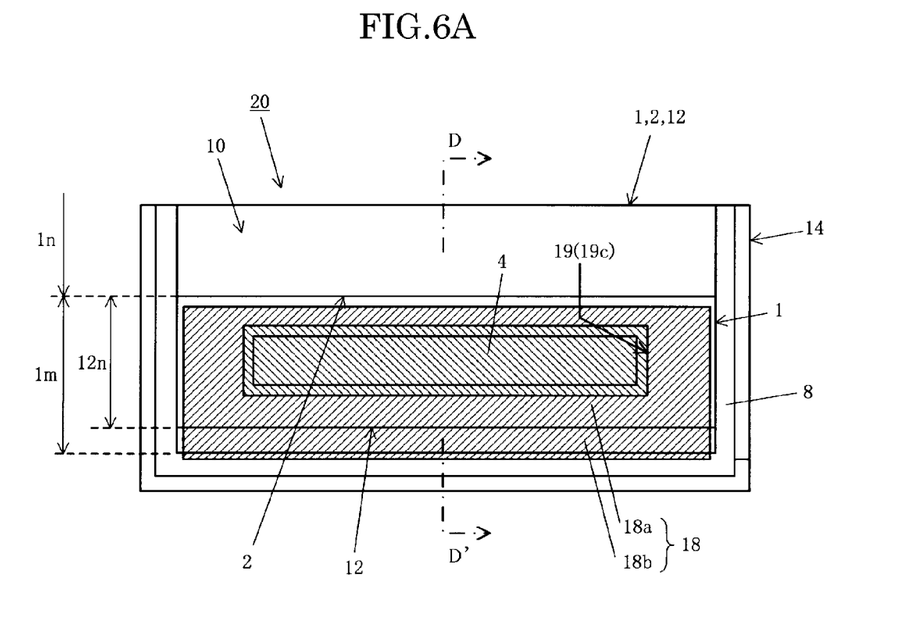
FIGS. 6A and 6B are diagrams showing a second modification of the embodiment according to the present invention (FIG. 6A is a plan diagram showing a portion of the structure of the liquid crystal display module with a touch panel, and FIG. 6B is a cross sectional diagram showing the structure along line D-D' of FIG. 6A)
Figure 6B:
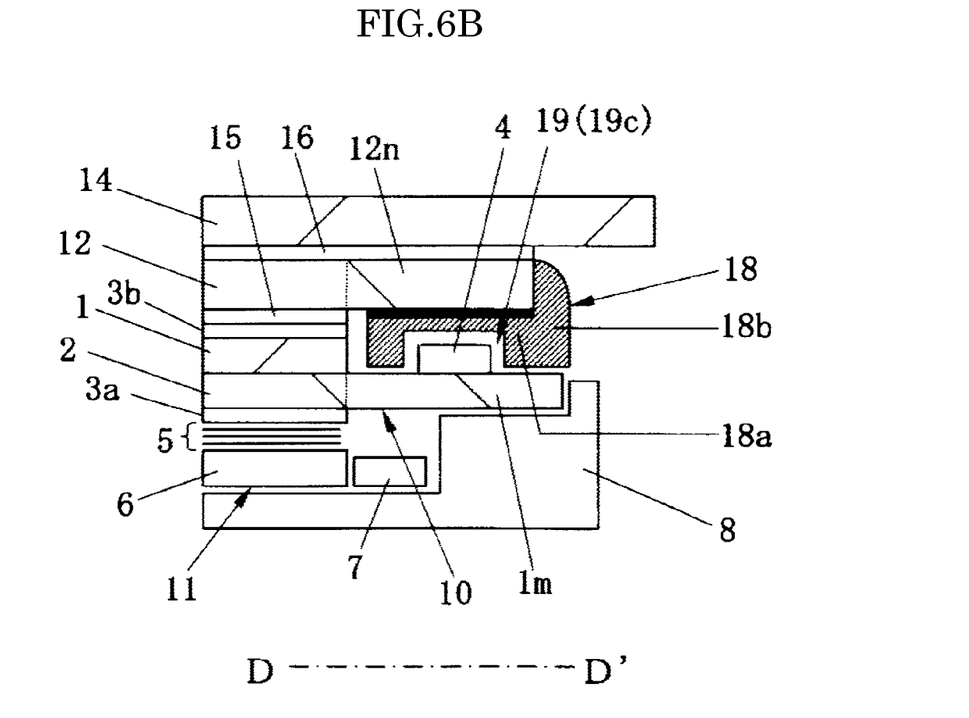

FIGS. 6A and 6B are diagrams showing the second modification of the embodiment of the present invention (FIG. 6A is a plan diagram showing part of the structure of the liquid crystal display module with a touch panel, and FIG. 6B is a cross sectional diagram showing the structure along line D-D' in FIG. 6A).

As shown in FIGS. 6A and 6B, the spacer 18 in the second modification has a containing portion 19 for containing the semiconductor chip 4 mounted on the non-overlapping region 1m on the TFT substrate 1 made of a recess 19c indented in the direction of the thickness of the touch panel 12. The spacer 18 having this structure has the same effects as the spacer 18 in the above described embodiment shown in FIG. 1. Here, in the case of the present embodiment, it is also difficult to insert the spacer 18 between the second overlapping region 12n on the touch panel 12 and the non-overlapping region 1m on the TFT substrate 1 on the liquid crystal display panel 10 after the touch panel 12 is pasted to the polarizing plate 3b on the TFT substrate 1 on the liquid crystal display panel 10, unlike in the case of the spacer 18 shown in FIG. 1.

Figure 7:
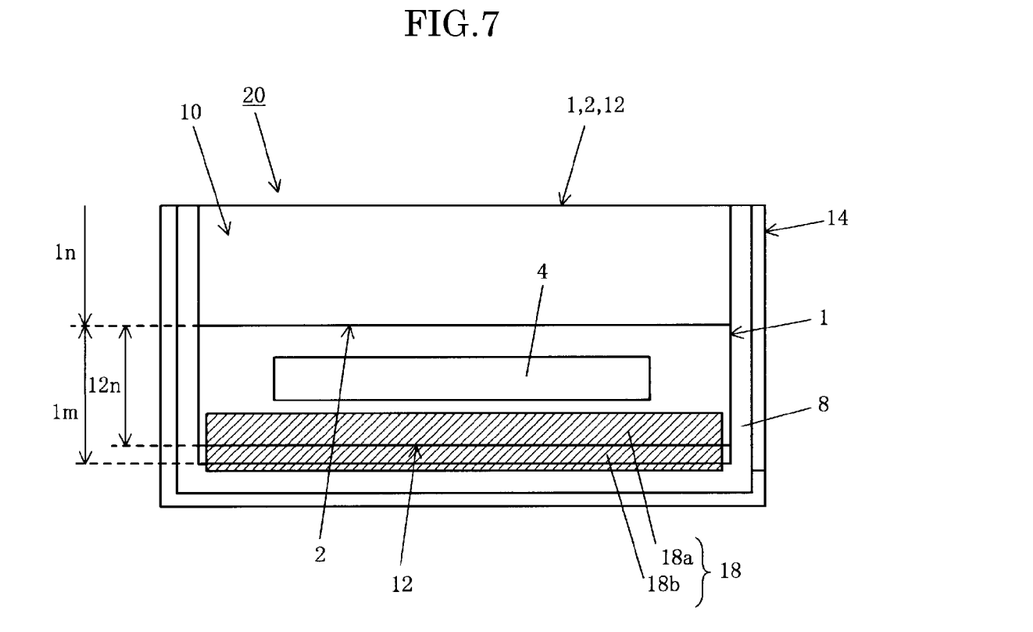
FIG. 7 is a diagram showing a third modification of the embodiment of the present invention (plan diagram showing a portion of the structure of the liquid crystal display module with a touch panel)

FIG. 7 is a diagram showing the third modification of the embodiment of the present invention (plan diagram showing part of the structure of the liquid crystal display module with a touch panel).

As shown in FIG. 7, the spacer 18 in the third modification has such a form that the first portion 1a extends along the short side of the touch panel 12 on the second overlapping region 2n side and is located closer to the short side of the touch panel 12 on the second overlapping region 2n side than the semiconductor chip 4. The spacer 18 having this structure has the same effects as the spacer 18 in the above described embodiment shown in FIG. 1.

Figure 8:
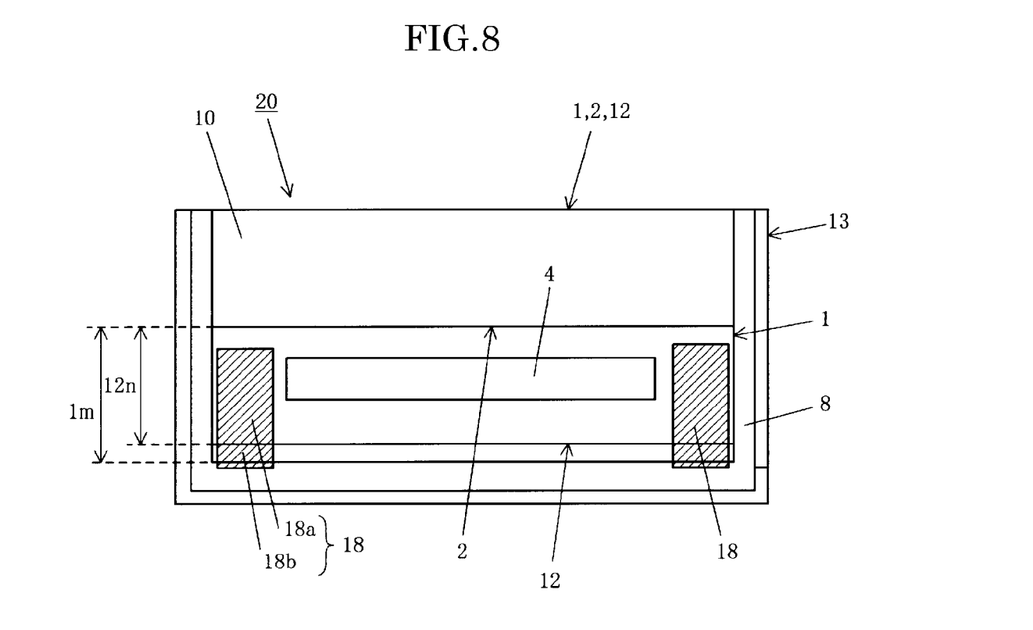
FIG. 8 is a diagram showing a fourth modification of the embodiment of the present invention (plan diagram showing a portion of the structure of the liquid crystal display module with a touch panel)

FIG. 8 is a diagram showing the fourth modification of the embodiment of the present invention (plan diagram showing part of the structure of the liquid crystal display module with a touch panel).

As shown in FIG. 8, the spacer 18 in the fourth modification has such a form that the first portion 18a extends along the long sides of the touch panel 12 and is located closer to the long sides of the touch panel 12 than the semiconductor chip 4, unlike the spacer 18 shown in FIG. 1. The spacer 18 having this structure also has the same effects as the spacer 18 in the above described embodiment shown in FIG. 1.

Here, though according to the above described JP2003-43450A a touch panel 4 is provided on the front side of the liquid panel 2, a support 34 is provided on the rear side of the liquid crystal panel 2, and a support member 35 is provided between the first protruding portion 301 of the touch panel 4 that protrudes from the liquid crystal panel 2 and the support 34 so that the first protruding portion 301 is supported by the support 34, this JP2003-43450A does not disclose the structure where the spacer 18 that is pasted and secured to the second overlapping region 12n on the touch panel 12 is provided between the non-overlapping region 1m on the TFT substrate 1 that forms the liquid crystal display panel 10 and the second overlapping region 12n on the touch panel 12 secured to the CF substrate 2 that forms the liquid crystal display panel 10, which characterizes the above described embodiment.

Here, an example where the present invention is applied to the liquid crystal display module with a touch panel of which the display panel is made of a liquid crystal display panel is described as the display device with a touch panel according to the above described embodiment. However, the present invention is not limited to this and can be applied to display devices with a touch panel where the display panel is made of other types of display panels, such as organic EL display panels or inorganic EL display panels.

Though the invention made by the present inventor is concretely described on the basis of the above embodiment, the present invention is not limited to the above embodiment and various modifications are, of course, possible as long as the gist of the invention is not deviated from.

What is claimed is:
1. A display device with a touch panel, comprising:
a display panel; and
a touch panel placed on a front surface of the display panel, characterized in that the display panel has a first substrate and a second substrate that is provided so as to be layered on the first substrate, the first substrate has a non-overlapping region that does not overlap the second substrate, a plurality of wires and a semiconductor chip are provided on the non-overlapping region of the first substrate, the touch panel is secured on the second substrate, the touch panel has an overlapping region that overlaps the non-overlapping region of the first substrate, and a spacer is directly secured and pasted to the touch panel in a region in which the overlapping region of the touch panel overlaps with the non-overlapping region of the first substrate so that the spacer does not contact the semiconductor chip and is not pasted to the non-overlapping region of the first substrate on which the semiconductor chip and the plurality of wires are provided;

wherein the spacer has a portion which covers at least a part of a side of the touch panel at the overlapping region of the touch panel, and wherein the side of the touch panel which is covered by the spacer is overlapped with the non-overlapping region of the first substrate.

2. The display device with a touch panel according to claim 1, characterized in that the spacer is pasted to the touch panel with an adhesive tape in between.

3. The display device with a touch panel according to claim 1, characterized in that the spacer is disposed away from a surface of the non-overlapping region of the first substrate so as not to make contact with the surface of the non-overlapping region of the first substrate.

4. The display device with a touch panel according to claim 1, characterized in that the spacer has a first portion placed in the region between the non-overlapping region of the first substrate and the overlapping region of the touch panel, and a second portion which is the portion of the spacer which covers the at least the part of the side of the touch panel at the overlapping region, the second portion is connected to the first portion, and is thicker than the distance between the non-overlapping region of the first substrate and the overlapping region of the touch panel.

5. The display device with a touch panel according to claim 4, characterized in that the second portion of the spacer has such a structure that the corner on the front side and on the outer side is rounded.

6. The display device with a touch panel according to claim 1, characterized in that the semiconductor chip has a driving circuit which is mounted on the non-overlapping region of the first substrate, and the spacer is formed along the side of the touch panel on the overlapping region side and has a containing portion for containing the semiconductor chip without making contact with the semiconductor chip.

7. The display device with a touch panel according to claim 6, characterized in that the containing portion in the spacer is a recess or a through hole in the direction of the thickness of the touch panel.

8. The display device with a touch panel according to claim 6, characterized in that the containing portion of the spacer is a recess directed from the second substrate to the side of the first substrate on the non-overlapping region side in a plane of the touch panel.

9. The display device with a touch panel according to claim 1, characterized in that a front panel is provided on the front surface of the touch panel.

10. The display device with a touch panel according to claim 1, characterized in that the display panel is a liquid crystal display panel having a liquid crystal layer sandwiched between the first substrate and the second substrate.

11. The display device with a touch panel according to claim 1, wherein the spacer is configured and disposed so as to substantially prevent bending of the first substrate toward the front of the display device when the display device is dropped.

* * * * *